July 16, 1940.  S. G. HAGOPIAN  2,207,731
METHOD AND MEANS FOR HANDLING BANANAS
Filed Oct. 2, 1936  2 Sheets-Sheet 1
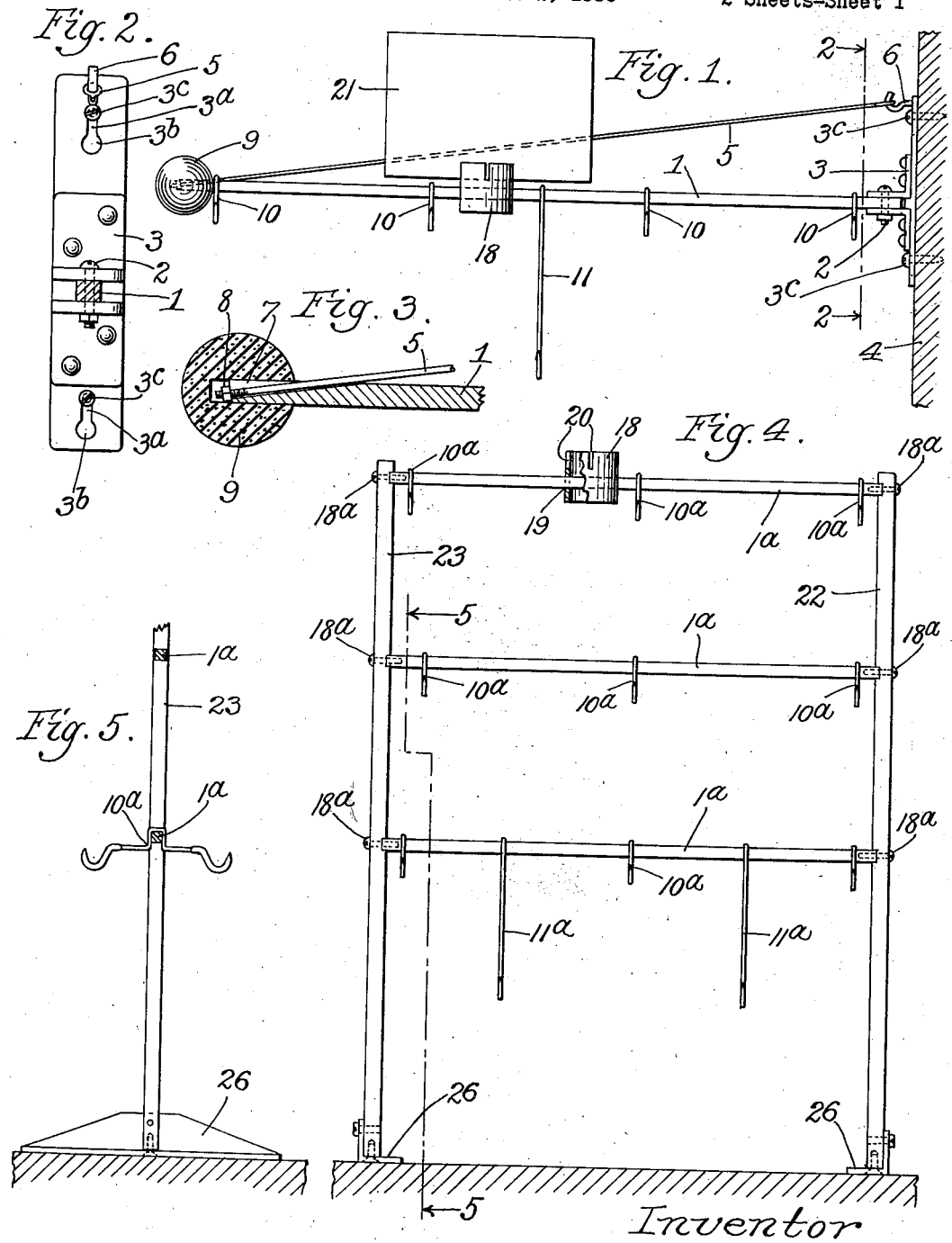
Inventor
Serophen G. Hagopian
by Parker & Carter
Attorneys.

July 16, 1940. S. G. HAGOPIAN 2,207,731
METHOD AND MEANS FOR HANDLING BANANAS
Filed Oct. 2, 1936 2 Sheets-Sheet 2
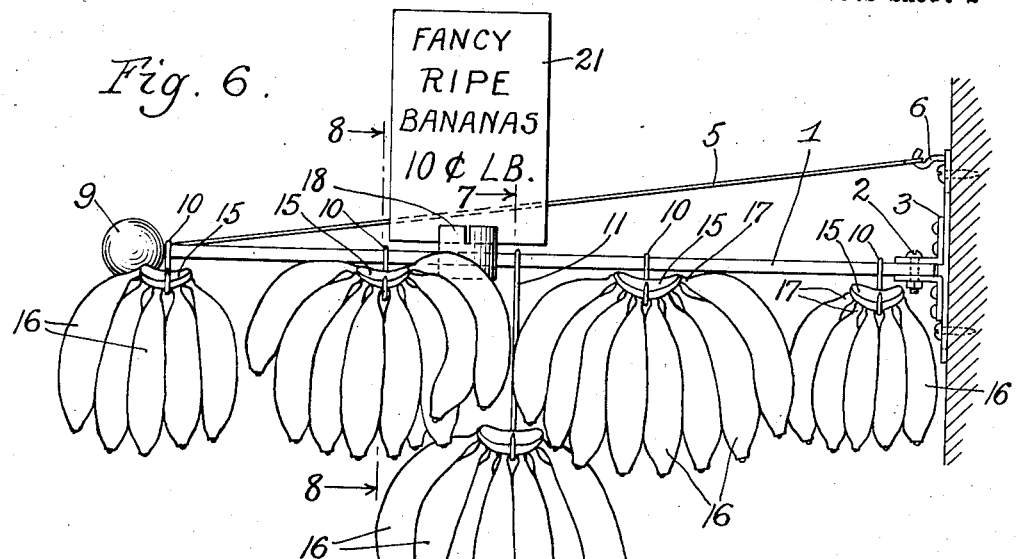
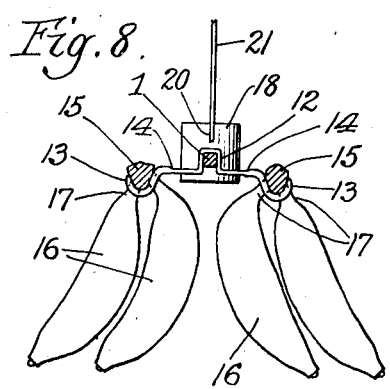
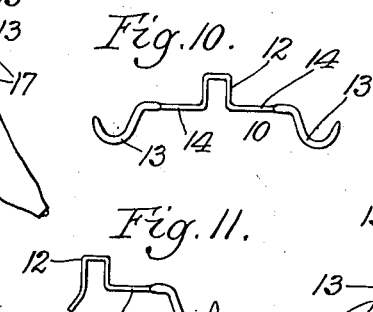
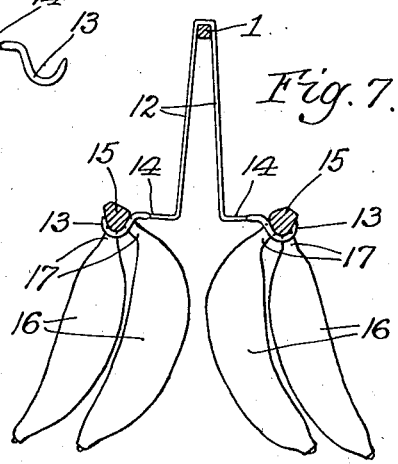
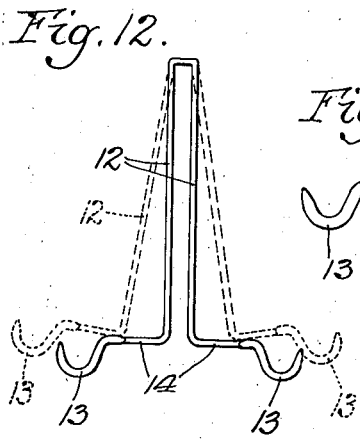
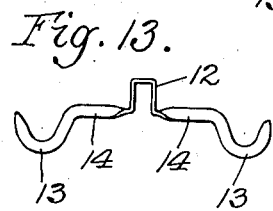
Inventor
Serophen G. Hagopian
by Parker & Carter
Attorneys.

Patented July 16, 1940

2,207,731

UNITED STATES PATENT OFFICE 2,207,731

METHOD AND MEANS FOR HANDLING BANANAS

Serophen G. Hagopian, Wilmette, Ill.

Application October 2, 1936, Serial No. 103,665

1 Claim. (Cl. 211—13)

This invention relates to a method and means for handling bananas and has for its object to provide a new method and means of this description.

The invention has as a further object to provide a method and means of handling bananas by means of which they are given a better flavor when ready for consumption. The invention has as a further object to provide a method and means for handling bananas which increases their attractiveness to consumers. The invention has as a further object to provide a method and means of handling bananas which increases their keeping qualities. The invention has as a further object to provide a method and means for handling bananas whereby they are more attractive while being displayed. The invention has as a further object to provide a method and means for handling bananas which greatly delays their becoming discolored. The invention has other objects which are more particularly pointed out in the accompanying description.

Referring now to the drawings, Fig. 1 is a view showing one form of apparatus for carrying out the method or process;

Fig. 2 is an enlarged sectional view taken on line 2—2 of Fig. 1;

Fig. 3 is a vertical section through the free end of the device shown in Fig. 1;

Fig. 4 is a view showing a modified construction for carrying out the method or process;

Fig. 5 is a sectional view taken on line 5—5 of Fig. 4;

Fig. 6 is a view similar to Fig. 1, showing the bananas in place on the device;

Fig. 7 is a sectional view taken on line 7—7 of Fig. 6;

Fig. 8 is a sectional view taken on line 8—8 of Fig. 6;

Fig. 9 is a perspective view of the data display card support;

Fig. 10 is a view showing one form of carrying device for the bananas;

Fig. 11 is a view showing a modified construction of the banana carrying device;

Fig. 12 is a view showing a further modified construction of the banana carrying device;

Fig. 13 is a view showing a further modified construction of the banana carrying device.

Like numerals refer to like parts throughout the several figures.

Bananas are usually received by the parties who sell them, in an unripened condition and attached to the stock upon which they grow, the stock having been severed from the tree. There are a number of bananas attached to each stock and they are in groups usually called "hands". Bananas are picked green and ripened wholly or partially generally in the hands of the seller. In order to properly ripen and retain their sweetness and flavor, it is essential that they shall be exposed to the air so that the air will be all around them. They cannot ripen properly when left attached to the stock because, the stock as it dries, saps the vitality, color and the flavor from the bananas and causes them to be discolored, streaked and to turn black when the seller severs the bananas from the stock. The usual practice is to sever the hands, leaving the bananas of each hand attached together. It is the usual practice to lay these hands of bananas down upon some surface, such as a counter or show window or some other surface, and the weight of the bananas causes the ones engaging the surface to be bruised and to turn sour and to rotten and to thus quickly deteriorate and become unsalable. When these hands of bananas are laid down upon some surface, the air cannot circulate about them and this also is a bad feature, preventing them from properly ripening.

The foregoing are evils which cause great loss to the people selling bananas, greatly reducing the sales of these bananas to the public and greatly reducing the appeal which the bananas should have to the buyers. The present method and apparatus eliminate these evils and disadvantages.

In carrying out the present invention, I support the bananas in such a manner that there is no pressure on the meat of the banana, and no bruises and resulting deterioration, and I also support the bananas so that the air circulates around them and so that they will have an attractive and appealing appearance to the buyers. I have illustrated in the drawings two supporting devices, one of which is particularly adapted for supporting and displaying the bananas in a show window, namely that of Figs. 1, 2 and 6, and the other of which is adapted for supporting and displaying the bananas at any desired point, being that illustrated in Figs. 4 and 5.

Referring now to Figs. 1, 2 and 6 and associated figures, I have provided a supporting device consisting of a supporting member 1 pivotally connected by a pivot 2 with a bracket 3 which may be attached to the wall 4 or other device in proximity to the point where it is desired to support the bananas. The bracket 3 may be of any desired form and I have illustrated a bracket which is provided with slots 3a which are enlarged at 3b so that the heads of the supporting screws 3c can be placed therein and the bracket then lowered to the position shown in Fig. 2, so that the parts will be properly supported. It will be seen that this bracket can be easily removed and attached in position without removing the screws 3c.

Located above the support 1 is a tension member or tie-rod 5 which is attached at one end to a fixed part 6 which may be a hook, and which is attached at the other end to the outer end of the support 1. As herein shown the outer end of the support 1 is provided with a slot 7 into which the member 5 is received and there is a nut 8 on the threaded end of the member 5 which engages the supporting member 1. I prefer to provide a member 9 into which the ends of the members 1 and 5 are received. This member is preferably a colored ball which will give added attraction to the device.

Suspended on the support are one or more banana carrying devices 10 and 11, which are preferably made up of three sections, a support engaging section 12 which slips over the support, a banana engaging section 13 which engages the bananas and a connecting section 14 which connects the sections 13 and 12. The supporting member is preferably non-circular in cross section, the preferred form being a construction where the upper and side faces are flat. The support engaging section 12 of the banana carrying device has similar upper and side faces so as to fit over the supporting device 1. This construction prevents turning of the banana carrying device on the support and insures holding of the bananas in proper position.

The hands of bananas when severed from the stock, are all connected together by a connecting piece 15, being that part of the stock to which the bananas 16 are directly attached. The banana engaging sections 13 of the carrying device also preferably have flat sides and are preferably formed in the shape of a hook, as indicated. In placing the bananas in position on the support, the connecting piece 15 is placed on the banana engaging section 13 and is lowered between the stems 17 of two of the bananas, as shown in Figs. 6, 7 and 8. The hands of bananas are thus supported one on each side of the supporting member 1. Additional bananas can be supported below the first row of hands by using the banana carrying devices wherein the connecting sections 12 are long enough to extend down far enough to suspend the second row of bananas so that they will not engage the first row, as shown in Fig. 6. These banana carrying devices furthermore engage the banana hands in such a manner as to take the strain off of the stems. It will be seen that the bananas may be easily attached to and removed from the carrying devices and that the carrying devices may be easily attached to and removed from the supporting members.

I also prefer to provide one or more data display card supports. As herein shown these consist of hollow members 18 which are provided with openings 19 through which the supporting members 1 pass and slots 20 into which the data display cards 21 are received. It will be seen that these cards can be easily placed in and removed from the hollow members 18 and that the hollow members can be slid along the supporting members 1 so as to be in a position that does not interfere with the placing of the banana carrying devices 10 and 11 on the supporting member 1.

In Figs. 4 and 5 I have shown a banana supporting device for general use and which is arranged to be placed upon any suitable support. In this construction the supporting devices 1a are connected to the frame pieces 22, 23 and the banana carrying devices 10a and 11a are similar in construction to those shown in Figs. 1, 2 and 6 to 13, and are connected to the support 1a in the manner shown in said figures. Any suitable number of banana carrying devices 10a and 11a may be utilized and short ones and long ones may be utilized so that large numbers of bananas can be supported in position without the bananas of the different hands coming in contact with each other. The device shown in Figs. 4 and 5 may be placed on the floor or on the counter or in any other desired place. I prefer to provide an enlarged base which as herein shown consists of an angle member 26 attached to the bottom of each frame piece 22 and 23. These bases are of sufficient size so that the device will stand wherever placed and will not require any fastening devices to fasten it in position. This device may also have any number of data display card supports 18. The ball 9, in addition to being ornamental, acts as a safety device in the event anyone strikes or runs into the end of the device. Without this ball, the sharp end would cause injury. I have illustrated the bananas as being divided into hands, but it is of course evident that it is not necessary to use complete hands, as the bananas may be simply divided into clusters.

When the bananas are arranged on this device, the bananas nearest the ceiling ripen first and consequently the dealer can arrange the device so that he sells first the ones that ripen first. The dealer might, for example, have six supporting members 1 arranged one above the other. The bananas on the top member would be ready for sale, for example, on Monday, the next member on Tuesday, the third member on Wednesday and the fourth, fifth and sixth members the remaining days of the week. Furthermore, if the bananas on the upper one or two supporting members were ripening too rapidly, these supporting members could be changed and brought into a lower position and the supporting members carrying the bananas not so ripe, could be placed in their position. When the supporting members are arranged as shown in Fig. 1, they can be easily arranged so as to lower the upper one and raise the lower one. When they are arranged as shown in Fig. 4, they are removably connected to the uprights 22 and 23 so that the same change from top and bottom can be easily brought about. For the purposes of illustration, I have shown the supporting member 1a as being removably attached to the supports 22 and 23 by the removable screws 18a.

The present process and apparatus therefore gives control over the mellowing or ripening of the bananas, improves the color, the flavor and the digestibility of the bananas, prevents bruising, denting and wounding, stops waste, spoilage and loss, makes the bananas attractive to the eye of the buyer, as well as to the buyer's palate, and provides a sanitary and wholesome surrounding for the bananas.

I claim:

A device for handling bananas in clusters comprising a supporting member, means for supporting said supporting member, banana carrying devices mounted on said supporting member, said banana carrying devices being provided with banana engaging sections which engage the connecting piece which connects the several bananas of the cluster together and which are at one side of the vertical plane passing through the supporting member, adjacent carrying devices being of different lengths so that the same supporting member supports clusters of bananas at different heights.

SEROPHEN G. HAGOPIAN.